Figure 1:
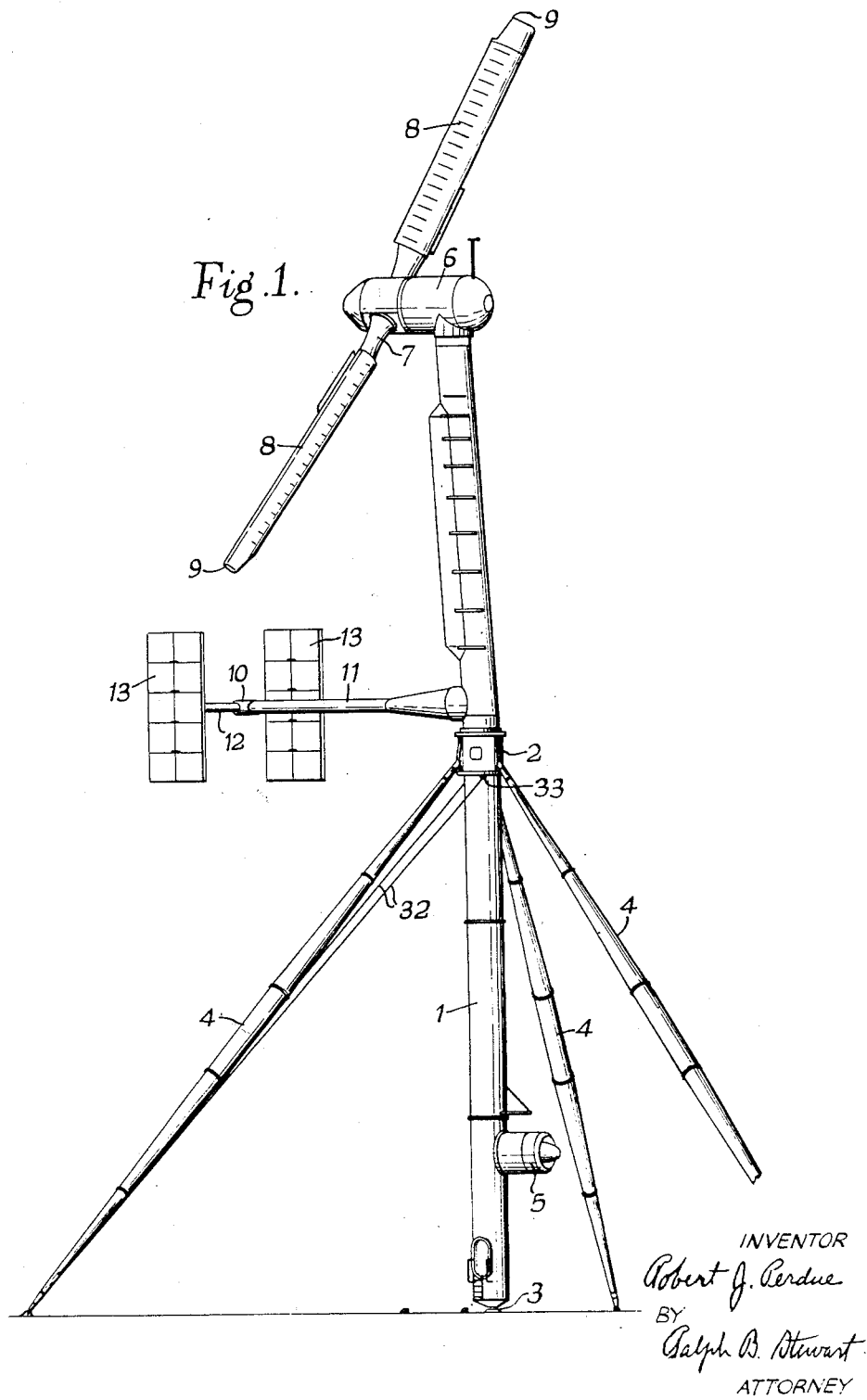

March 12, 1957 R. J. PERDUE 2,784,556
ANEMO-ELECTRIC POWER PLANTS
Filed Feb. 28, 1955 4 Sheets-Sheet 1

INVENTOR
Robert J. Perdue
BY
Ralph B. Stewart
ATTORNEY

March 12, 1957  R. J. PERDUE  2,784,556
ANEMO-ELECTRIC POWER PLANTS
Filed Feb. 28, 1955  4 Sheets-Sheet 2
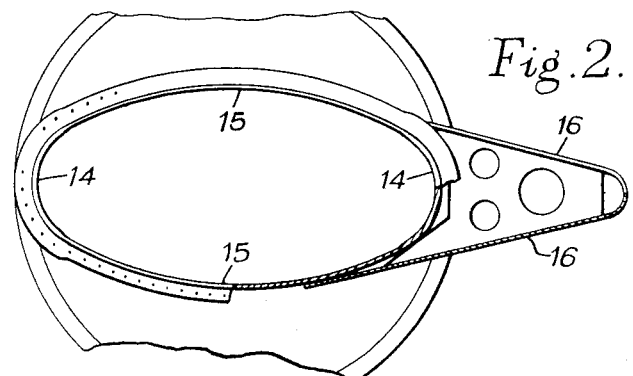
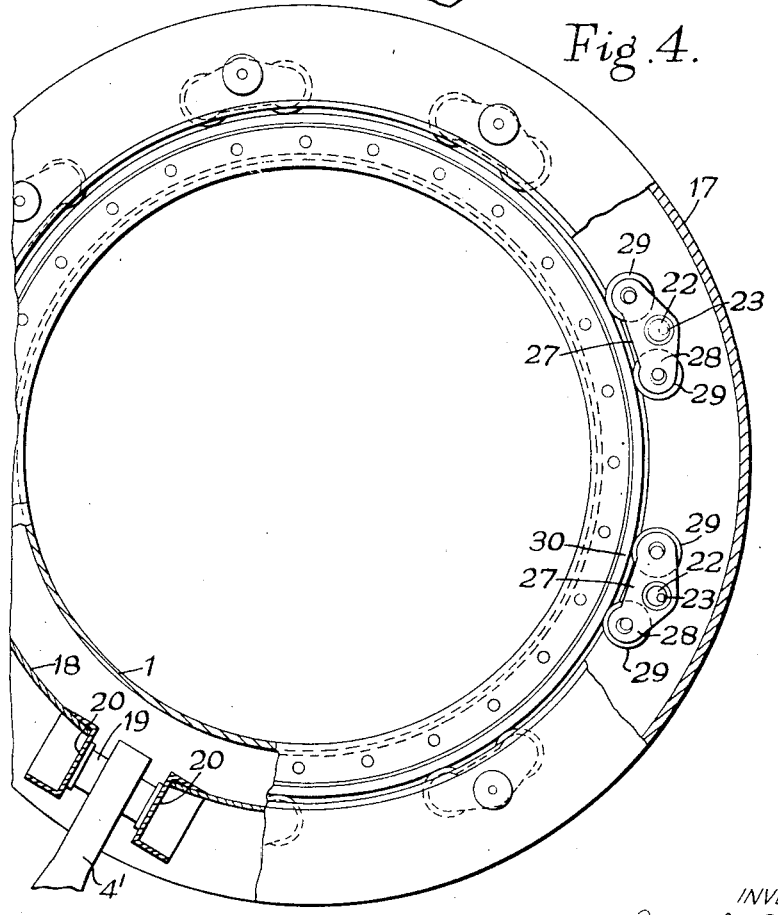
INVENTOR
Robert J. Perdue
BY Ralph B. Stewart
ATTORNEY March 12, 1957  R. J. PERDUE  2,784,556
ANEMO-ELECTRIC POWER PLANTS
Filed Feb. 28, 1955  4 Sheets-Sheet 3

INVENTOR
Robert J. Perdue
BY
Ralph B. Stewart
ATTORNEY 2,784,556
Patented Mar. 12, 1957

United States Patent Office

2,784,556
ANEMO-ELECTRIC POWER PLANTS

Robert John Perdue, Potters Bar, England, assignor to De Havilland Propellers Limited, Hatfield, England Application February 28, 1955, Serial No. 491,143

Claims priority, application Great Britain March 1, 1954

9 Claims. (Cl. 60—60)

The present invention relates to anemo-electric power plants which utilise the effect exerted by the wind upon the blades of a propeller, to cause rotation of the said propeller, and thereby to generate electric power. The invention relates more particularly to power plants of the kind which are operated on the so-called depression principle.

In this kind of power plant the blades of the propeller are hollow and are provided with apertures at their tips. The interior of each blade communicates, via an air-tight passage through its root and through the hub of the propeller, with the outlet of an air turbine which is coupled to an electric generator. When the wind velocity is of a value sufficient to cause rotation of the propeller, the air within the hollow blades is induced, by reason of the centrifugal force generated by its own mass, to flow out through the said apertures in the blade tips thereby forming a depression i. e. a pressure lower than that of the surrounding atmosphere, within the hollow blades. The air within the air-tight passages and the air turbine is then at a higher pressure than that of the air remaining within the blades and there is therefore established a continuous flow of air through the air turbine, the air-tight passages, the interiors of the blades and out through the said apertures. The flow of air through the air turbine supplies the power to drive the electric generator.

The propeller must of course be mounted vertically in an elevated position and the propeller hub must be capable of rotation about a vertical axis in order that it may face into wind. It is furthermore desirable that the turbine and generator be located at or near ground level in order to facilitate inspection and maintenance and to relieve the upper supporting structure of the weight of the said turbine and generator.

Previous known anemo-electric power plants comprise a propeller rotatably mounted on a headstructure which is itself mounted upon a tower for rotation about a vertical axis. The turbine and generator are secured at or near the base of the tower and an air-tight passageway extends from the outlet of the turbine, up the inside of the tower, through the head structure and into the hub of the propeller. This construction has the disadvantage that an air-tight seal must be provided between either the stationary tower and the movable headstructure or between a separate air-tight passageway in the tower and a further separate air-tight passageway in the headstructure.

The object of the present invention is to provide an improved construction of anemo-electric power plant which avoids the above-mentioned disadvantage, which is relatively simple and economical to manufacture and which results in a more efficient operation of the plant.

According to the invention there is provided an anemo-electric power plant adapted to be operated on the depression principle and comprising a substantially vertical supporting column having an air inlet at or near its lower end, an air turbine having its air outlet in air-tight communication with the air inlet of the column, an upper pintle bearing positioned intermediate the ends of the column, a lower pintle bearing positioned at or near ground level, said pintle bearings serving to mount the column for angular movement about a vertical axis, a head-structure rigidly secured to and maintained in an elevated position by said column, and a propeller rotatably mounted on said head-structure, the said propeller having a plurality of hollow blades provided with apertures at their tips and the said column and head-structure having an air-tight passageway effecting communication between the interior of the blades and the air inlet of the column.

Figure 3:
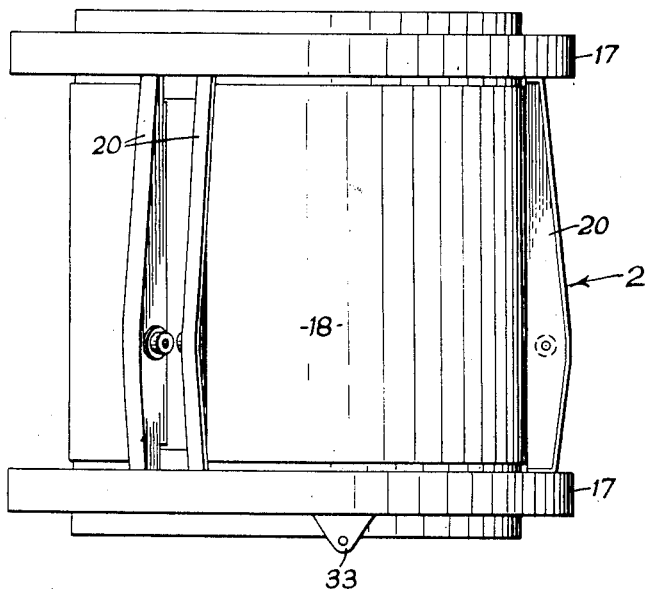
Figure 5:
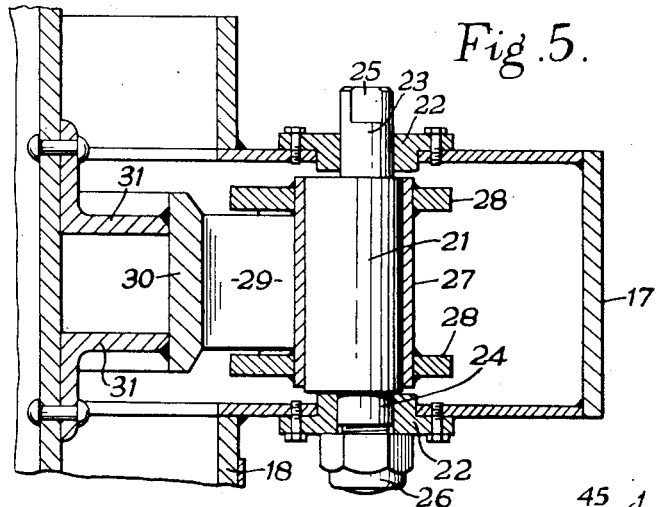
Figure 6:
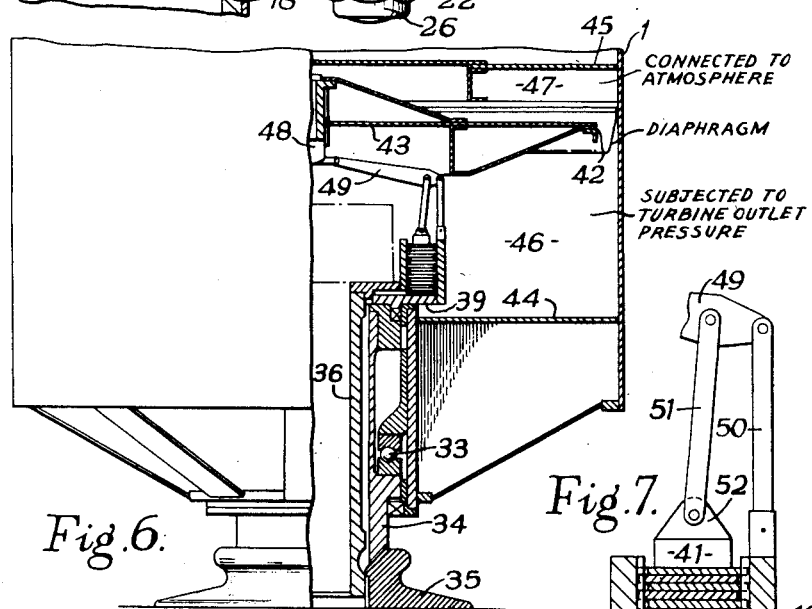
Figure 7:
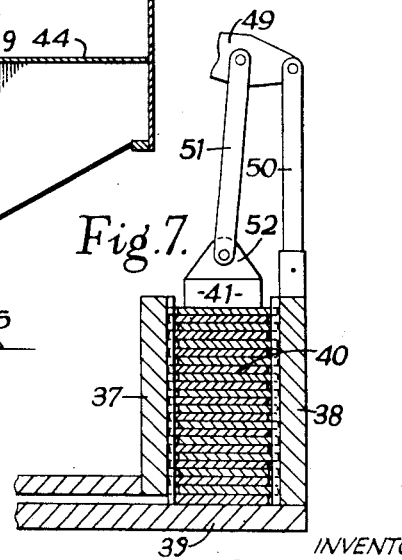

An embodiment of the invention will now be described, by way of example, with reference to the accompanying drawings in which:

Fig. 1 is an elevation view of the anemo-electric plant,

Fig. 2 is a cross-sectional plan view of the upper portion of the supporting column, Fig. 3 is an elevation view of the upper pintle bearing, Fig. 4 is a plan view of the upper pintle bearing, partially cut away to show details of construction, Fig. 5 shows a detail of the upper pintle bearing, Fig. 6 is a part sectional elevation view of the lower end of the column, and Fig. 7 shows a detail of the yaw damper.

As shown in the drawings the anemo-electric plant comprises a hollow supporting column 1 mounted for angular movement about a vertical axis by an upper pintle bearing 2 and a lower pintle bearing 3. The upper pintle bearing 2 is positioned intermediate the ends of the column 1 and is supported by a tripod of tubular steel struts 4, the lower ends of the struts being firmly anchored to the ground, and the lower pintle bearing 3 is positioned at the lower end of the column and rests upon a concrete foundation at ground level.

A turbine and generator unit 5 is secured to the column 1 near its lower end, the outlet of the turbine being in communication with the interior of the column 1, and a head-structure 6 is rigidly secured to the upper end of the column 1. A propeller 7, having hollow blades 8 provided with apertures 9 at their tips, is rotatably mounted upon the head-structure 6 and air-tight passageways through the hub of the propeller 7 and the head-structure 6 effects communication between the interior of the column 1 and the interior of the blades 8. The column 1, the turbine and generator unit 5, the head-structure 6 and the propeller 7 are thus adapted to rotate as a unit about the vertical axis.

A wind vane 10 for orienting the column 1 to bring the propeller 7 into wind is secured to the column 1 immediately above the upper pintle bearing 2, the outer ends of the wind vane being positioned below the tip path of the propeller blades 8. The wind vane 10 comprises a horizontal supporting stem 11, a cross bar 12 at the free end of said stem 11, and two control surfaces 13 arranged parallel to each other, one at each end of the cross bar 12. The wind vane 10 which must of course trail with respect to the column, is unaffected by air turbulence caused by the column 1 since the control surfaces 13 are spaced apart, one on each side of the column 1. The wind vane 10 is so positioned that the propeller 7 trails with respect to the head-structure 6, that is the wind vane 10 and the axis of the propeller 7 are parallel and project outwardly from the column 1 in the same direction. In addition, the turbine 5 is arranged on the opposite side of the column 1 to the wind vane 10, so that the air intake of the turbine 5 always projects into wind.

The lower portion of the column 1, that is the portion below the upper pintle bearing 2, comprises a vertical cylindrical shell and the upper portion of the column 1, as shown in Fig. 2 comprises a shell of elliptical cross-section, the major axis of which lies substantially parallel to the wind vane 10. The longitudinal axis of the upper portion of the column 1 is inclined at a small angle to the vertical, the inclination being towards the leeward side of the column 1, that is the side to which the wind vane is secured. The sides 14 of the upper portion of the column 1 at opposite ends of the major axis are constructed of sheet metal which is thicker than the sheet metal used in the construction of the sides 15 at opposite ends of the minor axis since, due to the orientation of the major axis into wind by the wind vane 10, the metal at the ends of the major axis is subjected to greater bending stresses than the remainder of the shell. In addition the upper portion of the column 1 is provided with a fairing 16 on its leeward side in order to streamline the said upper portion and prevent turbulence of the air stream in front of the propeller 7.

The upper pintle bearing 2 comprises a sleeve 18 having two channel housings 17 located one at each end of the sleeve 18. The sleeve is supported in a vertical position surrounding the column 1 by the tubular struts 4, the upper end 4' of each strut being mounted in a trunion 19 secured between two parallel flanges 20 welded to the sleeve 18. Each housing 17 is in the form of an annular channel opening inwards towards the axis of the sleeve 18 and an annular series of spindles 21 are mounted vertically in bearings 22 in the sides of the channel housing 17. The bearing shafts 23, 24 of each spindle 21 are mounted eccentrically with respect to the spindle axis whereby the radial distance between the spindle axis and the axis of the sleeve may be adjusted by angular movement of the spindle 21 about the axis of the shafts 23, 24. The spindle 21 may be turned by any suitable tool engaging a flat 25 on the outer end of the shaft 23 and the spindle 21 may be locked in any position of adjustment by a nut 26 screwed to the outer end of the shaft 24 and engaging a side of the associated bearing 22. A rocking arm 27 having two similar and parallel plates 28, is mounted on each spindle 21, the rocking axis of the arm 27 being intermediate its ends, and two rollers 29 are rotatably mounted one at each end of the arm 27. The rollers 29 mounted within each housing 17 are in rolling engagement with a separate roller track 30 associated with each housing and secured by flanges 31 to the column 1. The upper pintle bearing 2 therefore comprises two annular series of rollers 29 in engagement with two roller tracks 30 spaced apart, and the radial distance between the rollers 29 and the axis of the sleeve 18 may be adjusted by angular movement of the spindles 21 to bring all the rollers into firm contact with their associated roller tracks. Two wire ropes 32 secured to lugs 33 on diametrically opposite sides of the sleeve 18 prevent angular movement of the sleeve about its axis. The tripod of tubular struts 4 supports the weight of the upper pintle bearing 2 but is not suitable for resisting the torque produced by the rolling resistance of the rollers 29.

The weight of the column 1, the head-structure 6 and the propeller 1 is taken by the lower pintle bearing 3 which comprises a thrust bearing 33 mounted upon a thrust block 34 which is supported upon a base 35. A tube 36 extending through the base 35 and thrust block 34 serves as a conduit for the power cables of the turbine and generator unit 5.

The lower end of the column 1 is provided with a yaw damper which prevents the column and head-structure yawing violently with sudden changes in wind direction. The yaw damper comprises a vertical cylindrical member 37 secured to the stationary thrust block 34 and a vertical cylindrical member 38 secured to the column 1. The member 37 is disposed within and coaxial with the member 38 and an annular reaction member 39 secured to the lower end of the member 38 extends radially inwards across the lower end of the member 37. A series of annular friction plates 40, in frictional contact with one another, are positioned between the members 37 and 38, and supported by the member 39. Each alternate plate 40 is splined to the member 37 and each other plate 40 is splined to the member 38. An annular loading member 41 for pressing the plates 40 together against the reaction member 39 rests upon the top friction plate.

The yaw damper is loaded according to the wind velocity by utilising the pressure differential across the turbine. A diaphragm 42 having a central reinforcing disc 43 is positioned between two bulk heads 44, 45 to form two compartments 46, 47. The compartment 46 is in communication by a conduit, not shown, with the air at the outlet of the turbine and the compartment 47 is in direct communication with the atmosphere. A plunger 48 is secured to the disc 43 and six operating arms 49 extending radially outwards from the axis of the column 1 have their inner ends pivotally mounted to the plunger 48 and their outer ends pivotally mounted to brackets 50 secured to the upper end of the member 38. The operating arms 49 are connected to the loading member 41 by rods 51. One end of each rod 51 is pivotally connected to an arm 49 intermediate the ends of the arm, and the other end of each rod 51 is pivotally connected to a bracket 52 secured to the top of the member 41. The linkage mechanism 49, 51 thus effects vertical movement of the member 41 in response to vertical movement of the plunger 49.

In operation, the top surface of the diaphragm 42 is subjected to the pressure in compartment 47 which is at atmospheric pressure and the bottom surface of the diaphragm is subjected to the pressure in compartment 46 which is at the pressure existing at the outlet of the turbine. The difference in the pressures existing within the compartments 46, 47 therefore corresponds to the pressure differential across the turbine, and this difference in pressure imparts a downward thrust on the diaphragm and upon the plunger 48. The downward thrust on the plunger 48 is transmitted by arms 49 and rods 51 to the member 41 which presses the plates 40 against the member 39. The loading upon the plates 40 is thus dependent upon the pressure differential across the turbine, which pressure differential is in turn dependent upon the speed of the propeller. In the circumstances where the wind velocity is small, the speed of the propeller will be low and the yaw damper will provide little resistance to yawing movement of the column. In strong winds however the speed of the propeller will be high and the plates 40 of the yaw damper will be pressed firmly together against the member 39, thereby resisting relative angular movement between the members 37, 38 and thus resisting yawing movement of the column 1.

I claim:

1. An anemo-electric power plant adapted to be operated on the depression principle and comprising a substantially vertical supporting column having an air inlet at or near its lower end, an air turbine mounted on said column and having its air outlet in air-tight communication with the air inlet of the column, an upper pintle bearing positioned intermediate the ends of the column, a lower pintle bearing positioned at or near ground level, said pintle bearings serving to mount the column for angular movement about a vertical axis, a head-structure rigidly secured to and maintained in an elevated position by said column, and a propeller rotatably mounted on said head-structure, the said propeller having a plurality of hollow blades provided with apertures at their tips and the said column and head-structure having an air-tight passageway effecting communication between the interior of the blades and the air inlet of the column.

2. An anemo-electric power plant as claimed in claim 1 and including a wind vane secured to the column above the upper pintle bearing and operable by wind pressure to orient the column into a predetermined position relative to the direction of the wind, the said air turbine being secured to the column below the upper pintle bearing and having its air intake projecting into wind when the column is in the said predetermined position.

3. An anemo-electric power plant as claimed in claim 2, wherein the said propeller is located on the leeward side of the column when the column is in the said predetermined position and the upper portion of the column above the upper pintle bearing is formed with a substantially elliptical cross-sectional contour providing an aerodynamically streamlined construction to the upper portion of the column when the column is in the said predetermined position.

4. An anemo-electric power plant as claimed in claim 3, wherein the axis of the lower portion of the column below the upper pintle bearing is vertical and the axis of the upper portion of the column above the upper pintle bearing is inclined at a small angle to the vertical, the inclination of said upper portion being towards the leeward side of the column when the column is in the said predetermined position.

5. An anemo-electric power plant as claimed in claim 1 wherein said upper pintle bearing comprises in sleeve surrounding said column, two vertically spaced annular series of rollers rotatably mounted upon said sleeve and in rolling engagement with roller tracks secured to said column, and means for adjusting the radial position of said rollers relative to the axis of the sleeve.

6. An anemo-electric power plant as claimed in claim 5 wherein said means for adjusting the radial positions of the rollers comprise an annular series of vertical spindles for each annular series of rollers, a plurality of rocking arms mounted one on each of said spindles, adjacent rollers in each of said annular series of rollers being rotatably mounted one at each end of a rocking arm, and said vertical spindles being angularly adjustable upon said sleeve about axes eccentric to their own longitudinal axes.

7. An anemo-electric power plant as claimed in claim 2 and including a yaw damper for resisting angular movement of the column about the said vertical axis and means responsive to the pressure differential between the air pressure at the outlet of the turbine and atmospheric pressure for loading said damper in accordance with the said pressure differential.

8. An anemo-electric power plant as claimed in claim 7, wherein said yaw damper comprises a first element fixedly mounted relative to the ground, a second element fixedly mounted relative to the column, primary and secondary plates in frictional engagement with one another and drivably associated with said first and second elements respectively, and a loading member adapted to press said plates together against a reaction member, and said means responsive to the pressure differential comprises a diaphragm and a linkage mechanism interconnecting the diaphragm and the loading member to effect movement of said loading member in response to movement of said diaphragm.

9. An anemo-electrical power plant as claimed in claim 6, and including a wind vane secured to the column above the upper pintle bearing and operable by wind pressure to orient the column into a predetermined position relative to the direction of the wind, and wherein the said air turbine is secured to the column below the upper pintle bearing and arranged with its air intake projecting into wind, the said propeller is located on the leeward side of the column, the axis of the lower portion of the column below the upper pintle bearing is vertical, the axis of the upper portion of the column above the upper pintle bearing is inclined at a small angle to the vertical and towards the leeward side of the column, and the cross-sectional contour of the upper portion of the column is substantially elliptical with its major axis extending in the direction of the wind to provide an aerodynamically streamlined construction to the said upper portion when the column is in the said predetermined position.

References Cited in the file of this patent

UNITED STATES PATENTS

| | | |
|---|---|---|
| 2,112,633 | Moon | Mar. 29, 1938 |
| 2,485,543 | Andreau | Oct. 25, 1949 |

FOREIGN PATENTS

| | | |
|---|---|---|
| 66,995 | Denmark | June 7, 1948 |

OTHER REFERENCES

Article entitled: "Wind-generated electricity," appearing in "Engineering," March 25, 1955, vol. 179, pp. 371–374.